United States Patent [19]
Gotzenberger et al.

[11] 3,801,125
[45] Apr. 2, 1974

[54] GEAR DRIVE FOR MOTOR VEHICLES

[75] Inventors: Adolf Gotzenberger; Manfred Schneeweiss, both of Ingolstadt, Germany

[73] Assignee: Audi nsu Auto Union Aktiengesellschaft, Postfach, Germany

[22] Filed: Apr. 5, 1971

[21] Appl. No.: 131,009

[52] U.S. Cl. .................................... 280/96, 74/498
[51] Int. Cl. ............................................. B62d 3/12
[58] Field of Search ............... 280/96; 74/422, 498; 248/15, 24; 287/100

[56] References Cited
UNITED STATES PATENTS

| | | | |
|---|---|---|---|
| 3,061,036 | 10/1962 | Barton et al. | 180/79.2 R |
| 2,097,332 | 10/1937 | Krumhar et al. | 248/24 X |
| 2,935,150 | 5/1960 | Smith et al. | 280/96 X |
| 2,973,658 | 3/1961 | Bishop | 180/79.2 R X |
| 2,654,234 | 10/1953 | Christensen | 287/100 X |

FOREIGN PATENTS OR APPLICATIONS

| | | | |
|---|---|---|---|
| 852,544 | 10/1960 | Great Britain | 280/96 |
| 1,014,915 | 6/1952 | France | 248/15 |

Primary Examiner—David Schonberg
Assistant Examiner—Leslie J. Paperner
Attorney, Agent, or Firm—Richards & Geier, V. Alexander Scher

[57] ABSTRACT

A rack gear drive for motor vehicles has steering tie rods which are swingable about joints at the central portion of the rack. The gear casing has two tubular ends coaxial with the rack and fixed to the side walls of the car body. The invention is particularly characterized by the provision of separate holding screws extending through the tubular ends of the gear casing and through openings in brackets attached to the side walls of the car body.

5 Claims, 6 Drawing Figures

GEAR DRIVE FOR MOTOR VEHICLES

This invention relates to a rack gear drive for motor vehicles having steering tie rods swingable about joints at the central portion of the rack, as well as a gear casing with two tubular ends coaxial with the rack and fixed to the side walls of the car body.

An object of the present invention is to simplify the construction and the attachment of existing rack gear drives of this type.

Other types of the present invention will become apparent in the course of the following specification.

In the accomplishment of the objectives of the present invention it was found desirable to provide separate holding screws extending through tubular ends of the gear casing and through openings provided in brackets attached to side walls of the car body. Thus the rack gear drive is fixed in a simple manner with only two holding screws.

Each holding screw can carry a plug located in a tubular end of the casing and serving as a stop for the end of the rack. Thus the same holding means are used to accomplish two further tasks, namely, that of a plug and that of a stop for the rack. The openings for the holding screws in the brackets can have the shape of elongated holes in order to compensate for tolerances which take place during the manufacture of the car body.

Preferably, a buffer-like elevated portion coaxial with the rack can be provided upon the bottom wall of the plug and be directed toward the middle of the rack gear drive. Thus the rack strikes the plug resiliently and yieldably in the end position.

Finally, shaped annular tightening lips can engage the inner surface ends of rack drive casing to protect the interior of the casing against loss of lubricant and penetration of dust and moisture.

The invention will appear more clearly from the following detailed description when taken in connection with the accompanying drawings showing by way of example only, preferred embodiments of the inventive idea.

Figure 1:
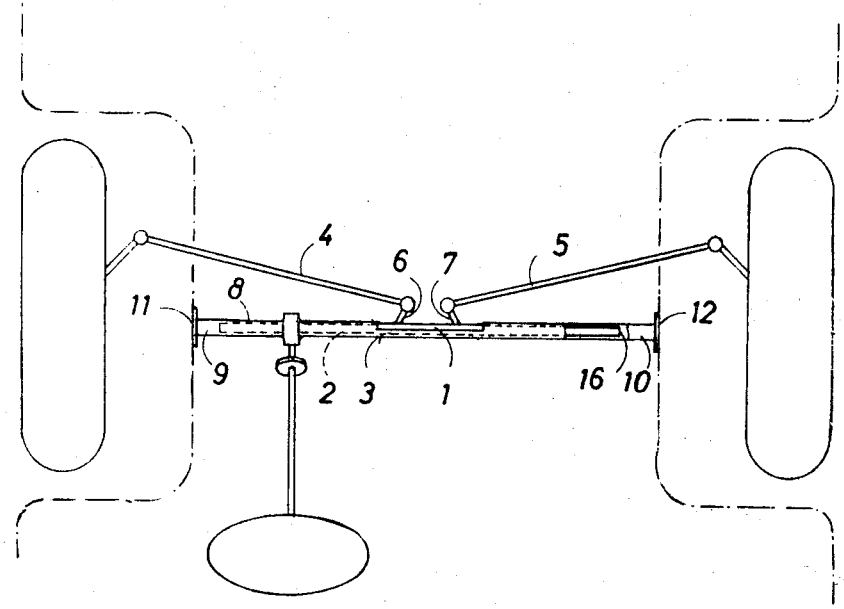
FIG. 1 is a diagrammatic top view partly in section of a rack gear drive of the present invention with attaching means at the side walls of the car body.

FIG. 1 of the drawings shows a rack 2 of a rack gear drive 3. Steering tie rods 4 and 5 are connected by joints 6 and 7 to the central portion 1 of the rack 2. The casing 8 of the drive has two ends 9 and 10 which are coaxial with the rack 2 and are fixed to the side walls 11 and 12 of the car body.

Figure 2:
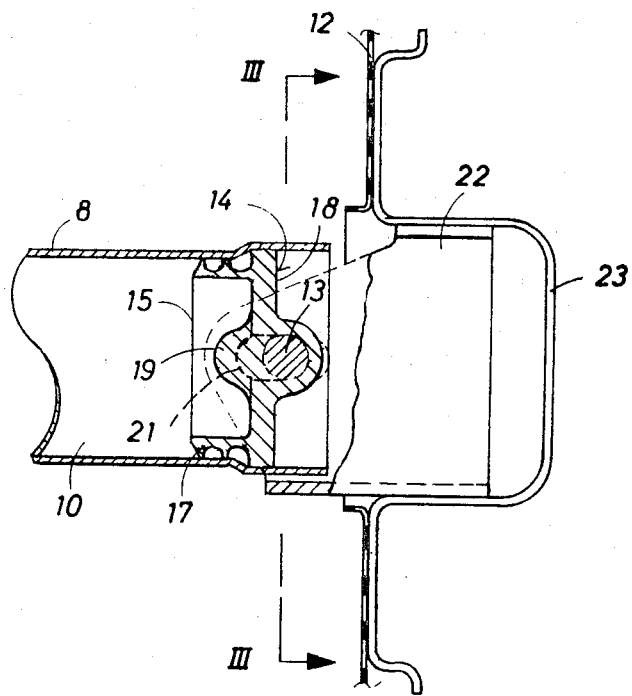
FIG. 2 shows a portion of the attaching means partly in section.
Figure 3:
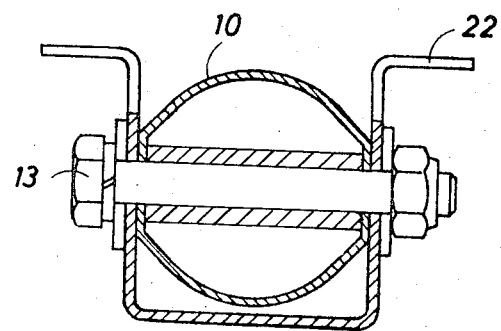
FIG. 3 is a section along the line III—III of FIG. 2.

As shown in FIGS. 2 and 3, a holding screw 13 extends through the end 10 of the casing 8. A similar holding screw (not shown) extends through the end 9 of the casing. The screw 13 extends also through the end member 14 having a surface 15 which is engaged by the end 16 of the rack 2 in its end position. The end member 14 made of a plastic material is constructed as a plug having sealing lips 17 engaging the ends of the casing. A buffer-like raised portion 19 coaxial with the rack 2 is located upon the bottom wall 18 of the end plug 14 and is directed toward the middle of the drive 3.

Figure 4:
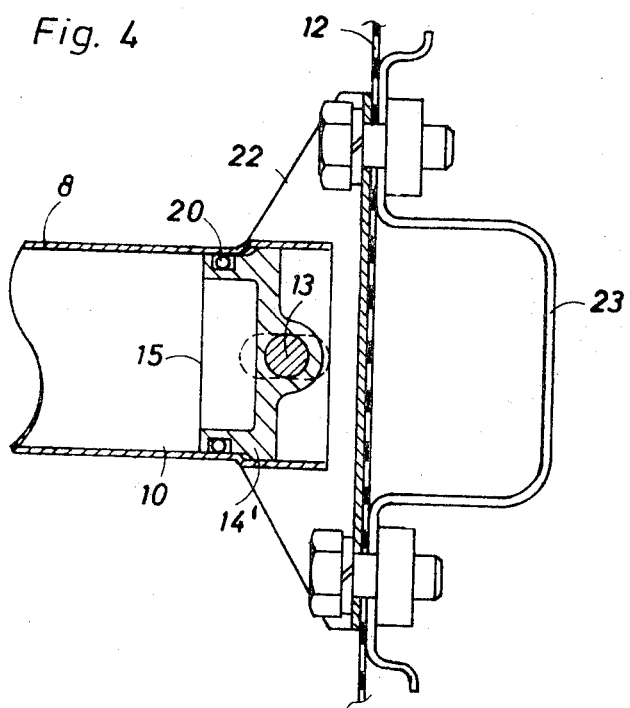
FIG. 4 is similar to FIG. 2 but illustrates a different embodiment.
Figure 5:
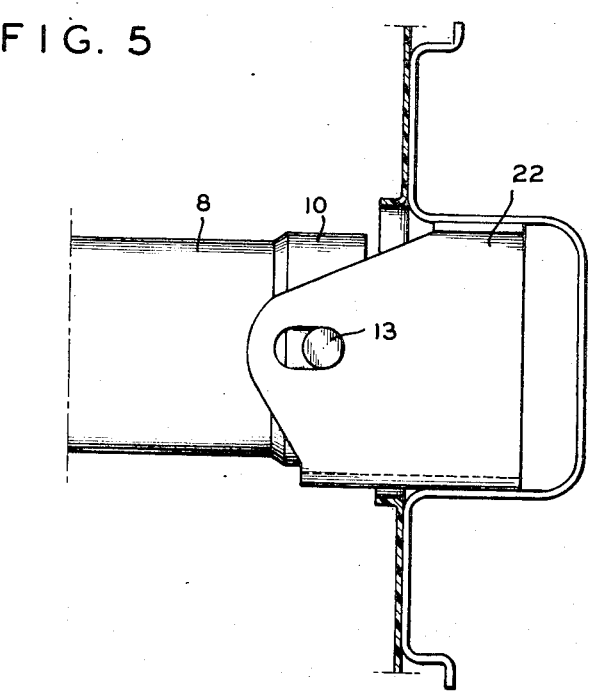
FIGS. 5 and 6 are perspective views showing the attaching means of FIG. 2 in greater detail.
Figure 6:
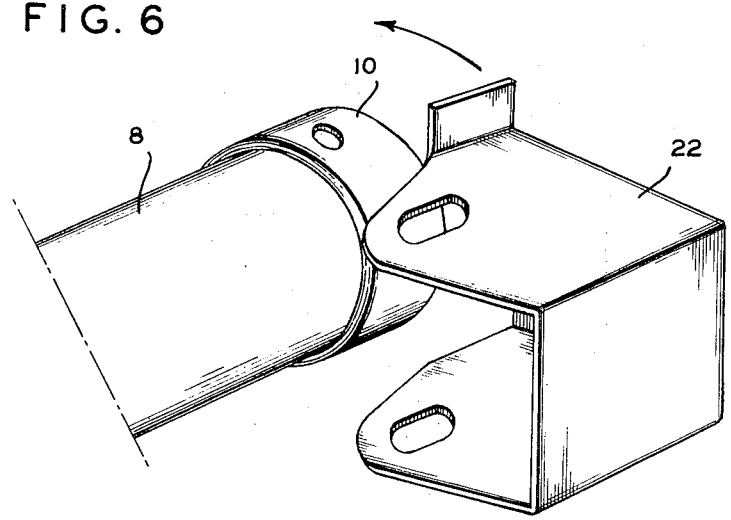

In the construction of FIG. 4 the closure 14' is made of metal and has an additional sealing number, such as a sealing ring 20 engaging the end of the casing.

The holding screws 13 extend through elongated openings 21 (FIG. 2) provided in brackets 22. The brackets 22 can be connected with a reinforcement 23 of the side walls 11 and 12.

Similar constructions are provided at the end 9 of the casing.

We claim:

1. A steering rack assembly for a motor vehicle having a car body, said assembly comprising a driving rack; a casing enclosing said driving rack, said casing having two opposed tubular ends coaxial with said rack; two opposed separate brackets each having top and bottom walls, one side wall and an open side, each of said side walls being fixedly attached to said car body, each of said tubular ends being received within said open side; and two opposed holding screws, each of which passes through a circular opening in each of said tubular ends and through two elongated openings formed in the top and bottom walls of each of said tubular brackets.

2. A gear drive according to claim 1, wherein each plug comprises annular sealing lips engaging inner surfaces of the casing adjacent to its ends.

3. A gear drive according to claim 1, comprising two plugs, each plug being located within a separate tubular end of the casing, each holding screw extending through a separate plug, each plug having a surface constituting a stop for a separate end of said rack.

4. A gear drive according to claim 1, wherein each plug has upon its inner surface a buffer-like elevated portion extending toward the middle of the drive.

5. A gear drive according to claim 4, wherein said buffer-like elevated portion is coaxial with said rack.

* * * * *